United States Patent [19]
Angellotti et al.

[11] Patent Number: 5,497,955
[45] Date of Patent: Mar. 12, 1996

[54] MECHANICAL LOCK-OUT FOR PREVENTING TAPE CARTRIDGE INSERTION INTO INCOMPATIBLE DRIVES

[75] Inventors: Thomas J. Angellotti; Steve C. Jackson; Devin A. Bloom, all of Loveland, Colo.

[73] Assignee: Hewlett-Packard Company, Palo Alto, Calif.

[21] Appl. No.: 214,884

[22] Filed: Mar. 16, 1994

[51] Int. Cl.[6] ................................................. G11B 23/087
[52] U.S. Cl. ..................... 242/338.4; 242/352.4
[58] Field of Search ....................... 242/335, 336, 242/341, 347, 338.4, 352.4; 360/94, 132

[56] References Cited

U.S. PATENT DOCUMENTS

| | | | |
|---|---|---|---|
| 3,971,071 | 7/1976 | Urayama | 242/335 |
| 4,636,903 | 1/1987 | Rudi | 242/338.4 |
| 4,898,338 | 2/1990 | Oishi | |
| 5,161,079 | 11/1992 | Ohshima et al. | 360/132 |
| 5,240,200 | 8/1993 | Nishimura et al. | 242/347 |
| 5,348,243 | 9/1994 | Ohmachi et al. | 242/347 |

FOREIGN PATENT DOCUMENTS

| | | |
|---|---|---|
| 0205074 | 12/1986 | European Pat. Off. |
| 0391465 | 10/1990 | European Pat. Off. |

OTHER PUBLICATIONS

Westlake Technology Corporation et al, Wide Tape Lockout Proposals Feb. 1993.
3rd Draft, Proposed American National Standard—Unrecorded Tape Mini–Cartridge for Information Interchange, (ASCX3 Project No. 553), Prepared by Technical Committee X3B5 of Accredited Standards Committee X3, Oct. 1987.

2nd Draft, Proposed American National Standard—Unrecorded Magnetic Tape Mini–Cartridge for Information Interchange, Prepared by Technical Committee X3B5 of Accredited Standards Committee X3, Oct. 1987.

Alan J. Richards, "Mini Data Cartridge: A Convincing Alternative for Low-Cost, Removable Storage", Hewlett-Packard Journal, May 1976, pp. 6–14.

*Primary Examiner*—John P. Darling
*Attorney, Agent, or Firm*—Augustus W. Winfield

[57] ABSTRACT

A guidance channel for a tape cartridge and a matching guide for a tape drive chassis to prevent a new design cartridge from being inserted into an old design drive but permitting new design drives to accept new design cartridges or old design cartridges. The cartridge guidance channel is wide at the front of the tape cartridge and narrow at the back of the tape cartridge. Tape cartridges having a narrow channel at the back end cannot be inserted into a drive chassis having a guide with a uniform wide width. The drive chassis guide is narrow at the front and wide at the back. The drive chassis guide can mate with tape cartridge channels having a uniform wide width or with tape cartridge channels having a narrow channel at the back end.

7 Claims, 9 Drawing Sheets

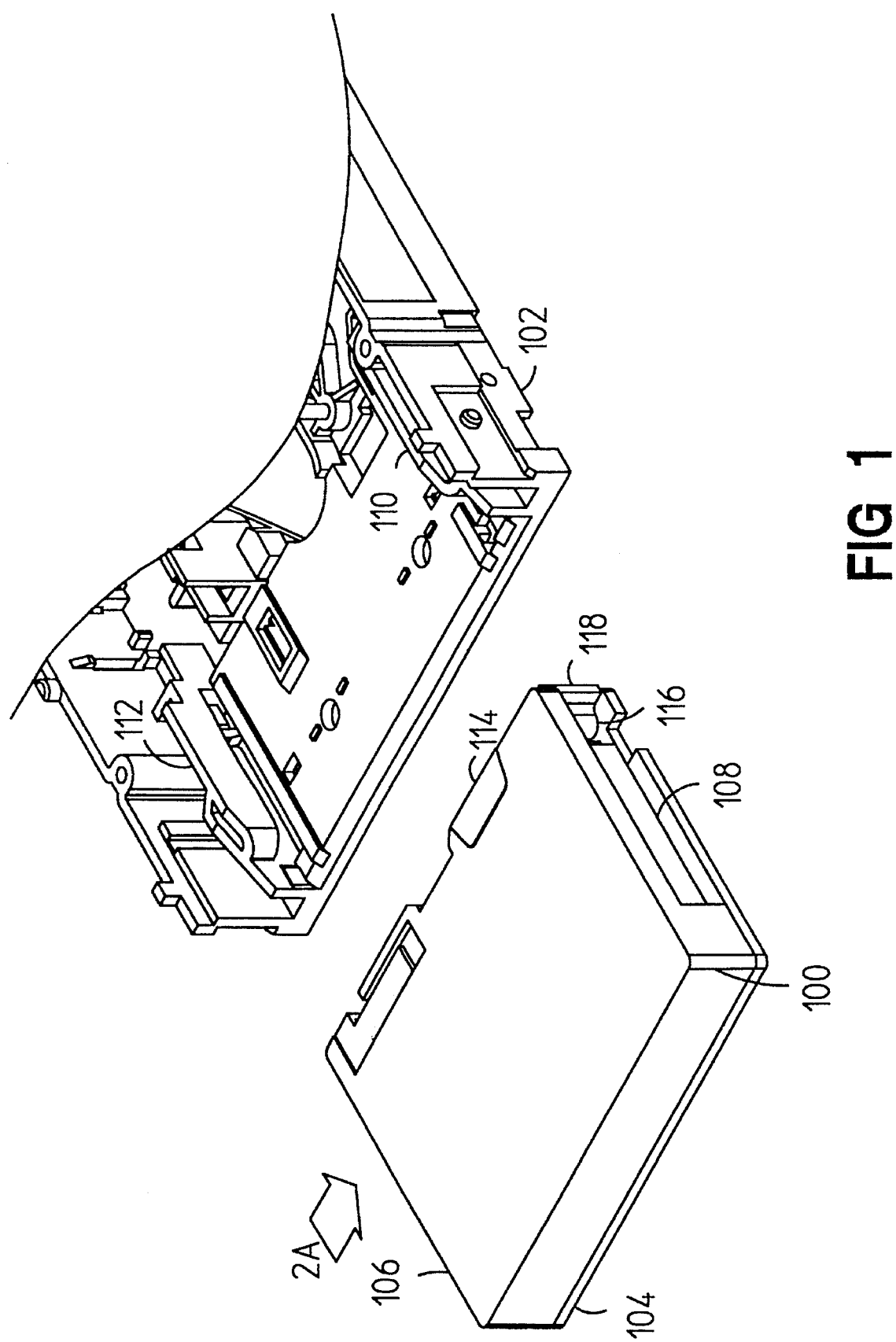

MECHANICAL LOCK-OUT FOR PREVENTING TAPE CARTRIDGE INSERTION INTO INCOMPATIBLE DRIVES

FIELD OF INVENTION

This invention relates generally to magnetic data cartridges and associated drive mechanisms and more specifically to designs to prevent insertion of a new modified cartridge into existing drive mechanisms.

BACKGROUND OF THE INVENTION

In 1972, a belt driven tape cartridge design (U.S. Pat. No. 3,692,255, issued to Robert A. Von Behren) was introduced for use in the computer industry for digital tape recording. Cartridges commonly in use in 1972 were approximately 100 mm by 150 mm and the magnetic tape was 6.35 mm (0.250 inches) wide. Cartridges of that size and corresponding drive mechanisms are still commercially available. In 1976, smaller data cartridges were developed, as described by Alan J. Richards, *Mini Data Cartridge: A Convincing Alternative for Low-Cost, Removeable Storage,* Hewlett-Packard Journal, May, 1976. The mini-cartridge size is 63.5 mm by 82.5 mm. Versions of the mini-cartridge are commercially available from a variety of vendors with tape widths varying from 3.81 mm (0.150 inches) to 6.35 mm (0.250 inches). New versions of mini-cartridges have been proposed having a tape width of 8.00 mm (0.315 inches). The external dimensions of the proposed cartridges are identical to existing mini-cartridges but there are numerous internal changes to accomodate wider tape.

Drive mechanisms for the the various belt-driven cartridge designs discussed above have a magnetic head that contacts magnetic tape within the cartridge through one opening in the front of the cartridge. In general, regardless of head position, the full width of the tape is supported by the magnetic head. However, if a cartridge containing 8.00 mm tape should be placed in a drive designed for 6.35 mm tape or narrower, the width of the head may not always support the full width of the wider tape. In particular, when the read/write gap of the head is at a track adjacent to one edge of the 8.00 mm tape, the head may not be wide enough to support the entire tape. If the tape overlaps a sharp edge on the head, the tape may be damaged. Therefore, there is a need to ensure that cartridges containing wide tape cannot be inserted into drives designed solely for narrower tape. There is a need to ensure that new drives can accept both narrow and wide tape cartridges. In addition, there is need to minimize changes to existing cartridge and chassis molds.

Each of the cartridges described above has a metal baseplate and a plastic cover. The cover has a top surface (the largest surface), a front surface having openings for accepting a magnetic head and drive roller in the drive mechanism, and two side surfaces. Each side surface has an elongated channel parallel to the metal baseplate with one side of the channel formed by an exposed portion of the metal baseplate. For alignment of the cartridge to the drive in a direction parallel to the metal baseplate of the cartridge, the drive chassis has an elongated guide corresponding to each of the channels in the cartridge sides. Vertical (perpendicular to the metal baseplate) alignment of the cartridge to the drive is accomplished by forcing the exposed portions of the metal baseplate against the lower surfaces of the chassis guides.

A pivoting door covers one opening in the front of the cartridge, with the pivot point in one corner next to one of the channels, and part of the door extends beyond the pivot point into the adjacent channel area. When the cartridge is inserted into a drive, the drive guide corresponding to the door pivot point engages the extension of the door so that the door is pivoted open as the cartridge is inserted.

SUMMARY OF THE INVENTION

For cartridges containing wide tape, the elongated channel along one side of the cartridge is modified by making the channel narrower toward the back of the cartridge. The metal baseplate of the cartridge still provides one edge of the modified channel for mechanical reference. The channel adjacent to the door pivot is not modified. A drive chassis for cartridges containing wide tape has a modified guide that is wide toward the rear of the chassis and narrows toward the front of the chassis to fit modified cartridge channels. In a drive designed for the original (narrow tape) cartridges, the relatively wide guide will not fit into the narrow channel of a modified (wide tape) cartridge. The front part of the modified channel and the corresponding rear part of the modified guide in the drive remains the original width. The wide rear portion of the modified guide can then support the original cartridges so that the new drives remain backward compatible with older cartridges. Preferably, the bottom edge of the modified guide in the chassis has a lower surface of the same length as original chassis guides to provide full support of the metal baseplate of an inserted cartridge. Making the channel narrower is accomplished by removing material from the mold for the plastic cartridge covers.

BRIEF DESCRIPTION OF THE DRAWINGS

FIG. 1 is a perspective view of a data cartridge and a drive chassis.

FIG. 4B also defines a horizontal plane for a cross sectional view in FIG. 6.

DETAILED DESCRIPTION OF THE PREFERRED EMBODIMENT OF THE INVENTION

Figure 2A:
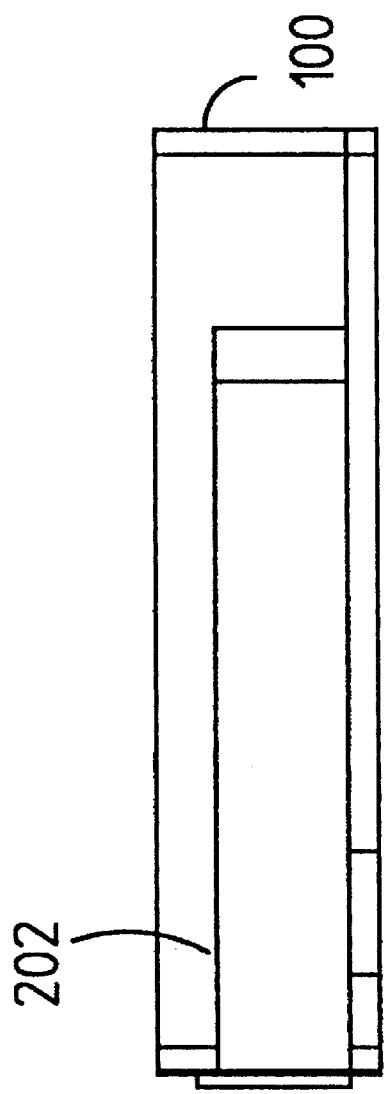
FIG. 2A (prior art) is a side view of a narrow tape data cartridge illustrating a prior art data cartridge guidance channel.

FIG. 1 is a perspective view illustrating a data cartridge 100 and a chassis 102 for a drive mechanism. The data cartridge has a metal baseplate 104 and a plastic top 106. A guidance channel 108 mates with a matching chassis guide 110 that is partially hidden in FIG. 1 but is essentially symmetrical to the visible chassis guide 112. A data cartridge door 114 pivots around a pivot point 116. The door 114 has an extension 118 protruding into the channel 108 so that as the data cartridge 100 is inserted into the drive 102, the guide 110 pivots the door 114 to an open position. Arrow 2A illustrates the view direction for FIG. 2A.

FIG. 2A (prior art) is a side view of the data cartridge 100 illustrating a prior art data cartridge guidance channel 202. Channel 202 is essentially symmetrical to channel 108 illustrated in FIG. 1.

Figure 2B:
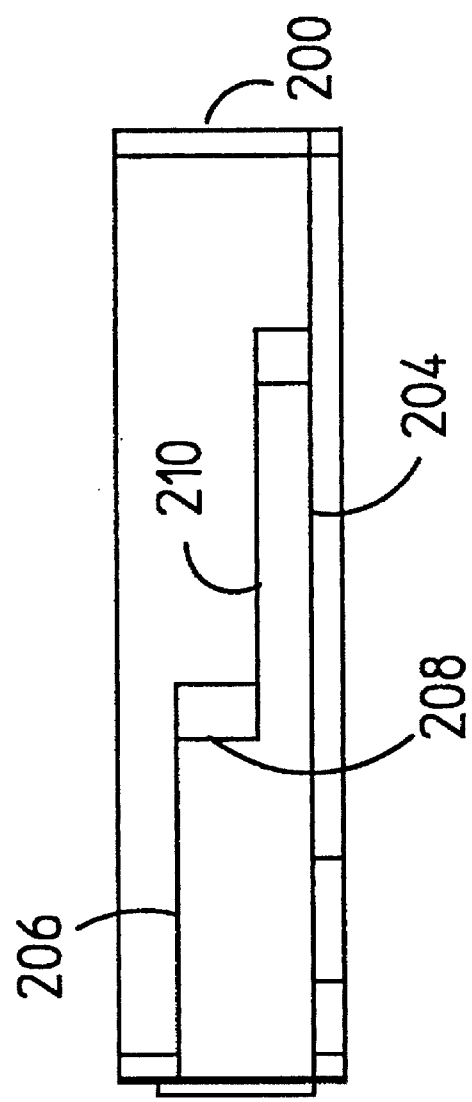
FIG. 2B is a side view of a wide tape data cartridge illustrating a data cartridge guidance channel in accordance with the present invention.

FIG. 2B is a side view of a new (wide tape) data cartridge 200 having an improved data cartridge guidance channel 204. Channel 204 has a wide portion 206 that is the same width as channel 202 in FIG. 1A. Channel 204 has a step 208 to a narrow portion 2 10. If cartridge 200 with its narrow channel portion 210 is inserted into chassis 102 (FIG. 1) having chassis guide 112 (FIG. 1), the narrow channel portion 210 will prevent complete insertion. That is, the new data cartridge 200 cannot be inserted into a chassis designed to accept only prior art data cartridges such as cartridge 100 in FIG. 2A. Note also that modifying existing molds to make the narrow channel portion 210 may be accomplished by simply removing material from a mold for the cartridge plastic top cover.

Figure 3:
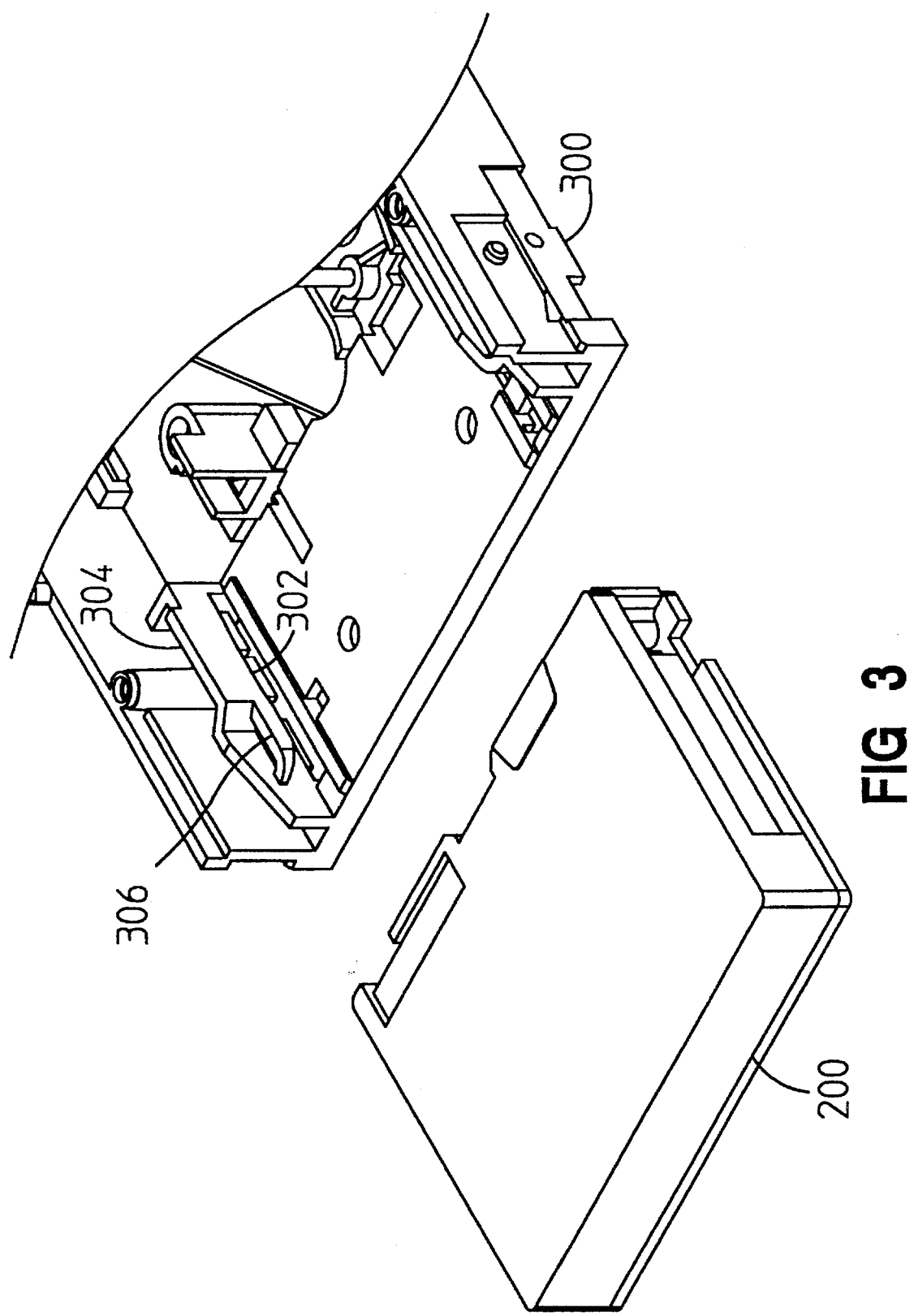
FIG. 3 is a perspective view of a data cartridge and drive chassis as in FIG. 1 but illustrating a drive chassis guide capable of use with a data cartridge guidance channel as illustrated in either FIG. 2A or FIG. 2B.

FIG. 3 illustrates the new data cartridge 200 and a new chassis 300. The new chassis 300 has one guide 302 having a wide portion 304 and a narrow portion 306. The wide guide portion 304 mates with the wide channel portion 206 (FIG. 2B) of the new cartridge 200 (FIG. 2B) or with channel 202 in the prior art data cartridge 100 (FIG. 2A). The narrow guide portion 306 mates with the narrow channel portion 210 (FIG. 2B) of the new cartridge 200 (FIG. 2B). Note that either prior art data cartridges as illustrated in FIG. 2A or new data cartridges as illustrated in FIG. 2B can be used with chassis 300. Note also that only one cartridge channel 204 (FIG. 2B) on one side of data cartridge 200 has been modified relative to cartridge 100. Of course, each of the two cartridge channels could be made symmetrical but one groove with a narrow portion (FIG. 2B, 210) is sufficient to prevent insertion of a new cartridge into an incompatible drive chassis.

Figure 4A:
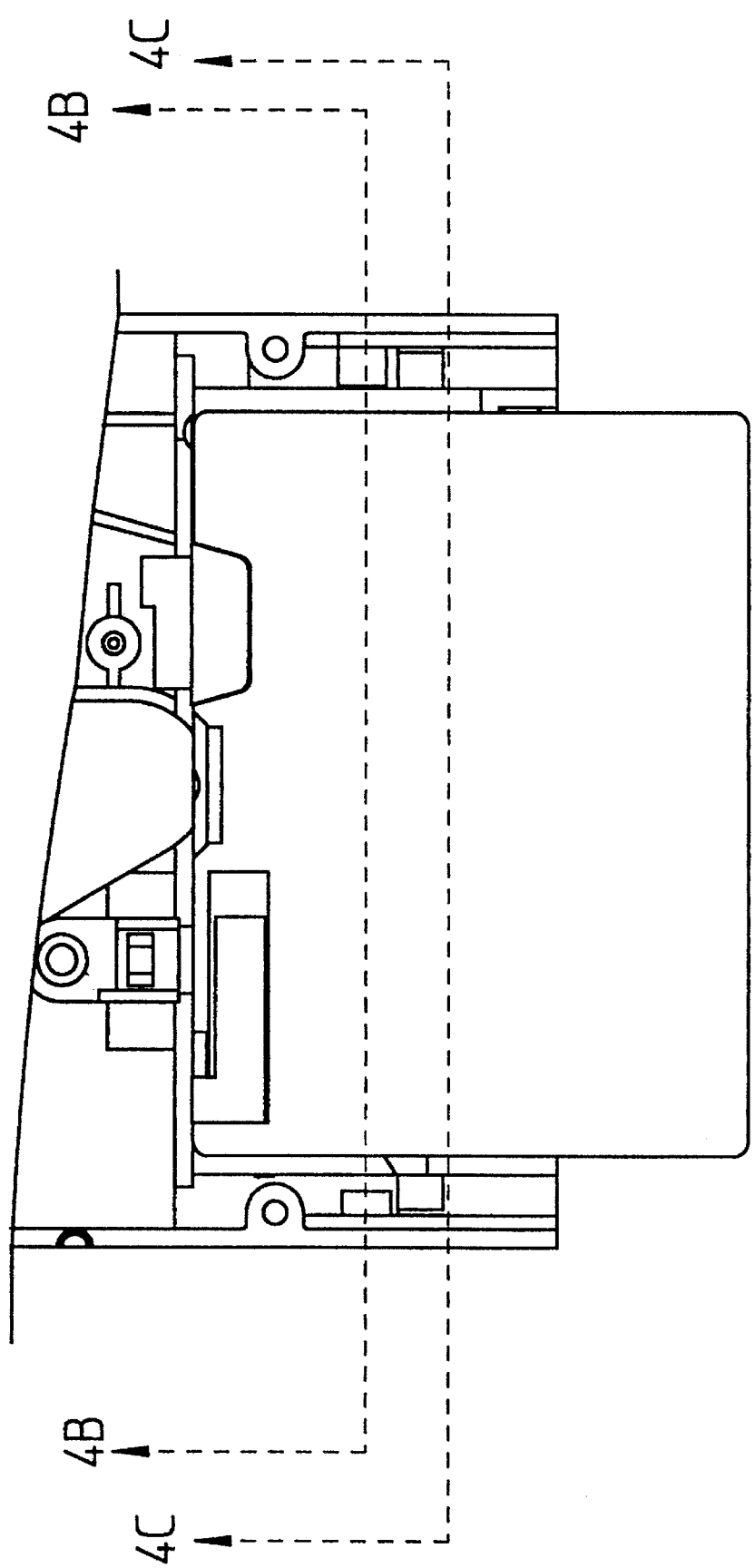
FIG. 4A is a top view of a data cartridge inserted into a drive chassis defining vertical planes for cross sectional views in FIG. 4B and FIG. 4C.
Figure 4B:
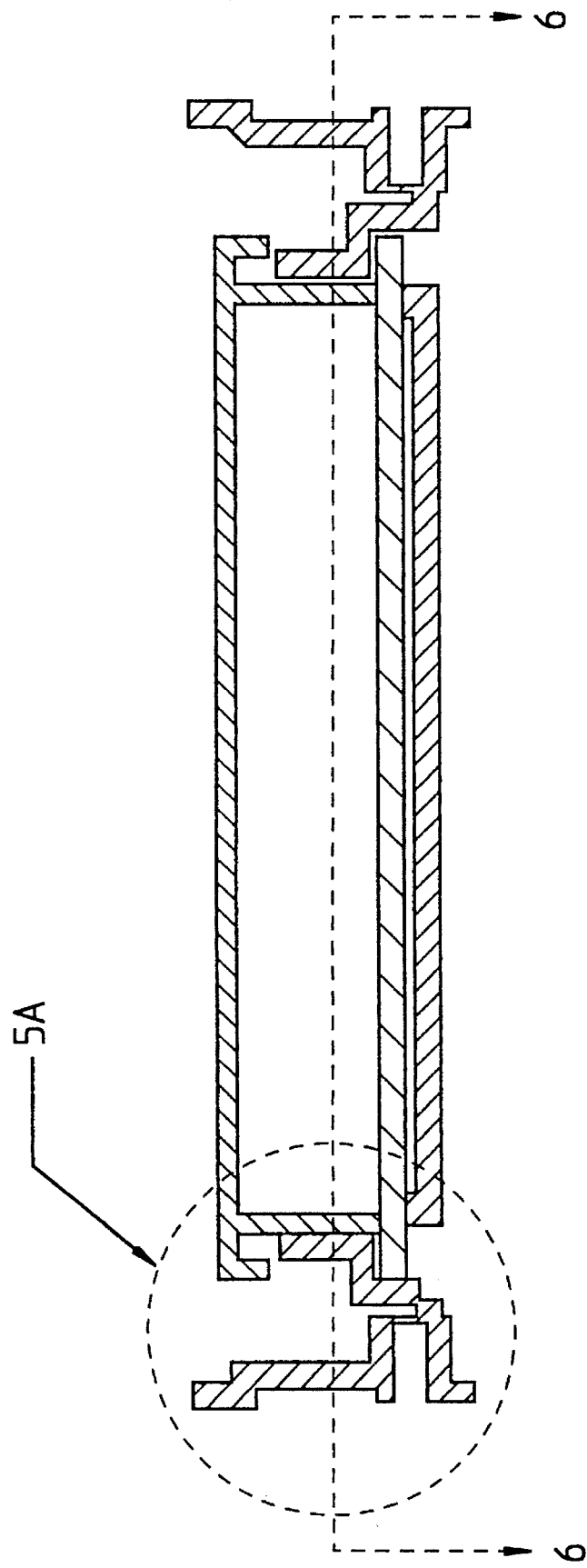
FIG. 4B is a cross section through a data cartridge and drive chassis illustrating mating surfaces for the drive chassis guides and the data cartridge guidance channels.
Figure 4C:
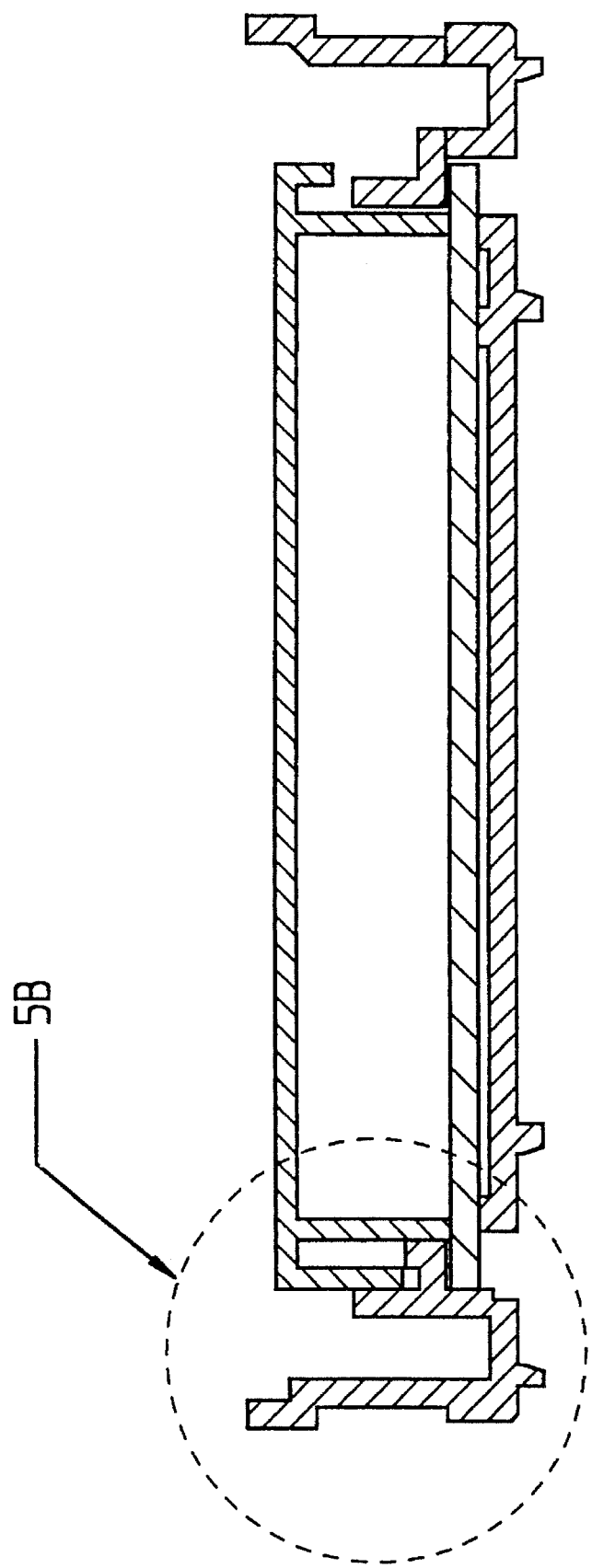
FIG. 4C is a cross section through a data cartridge and drive chassis illustrating mating surfaces for the drive chassis guides and the data cartridge guidance channels.

FIG. 4A is a top view of a new data cartridge as illustrated in FIG. 2B inserted into a new drive chassis as illustrated in FIG. 3. FIG. 4B is a vertical section through the data cartridge wide channel portion 206 and the chassis wide guide portion 304. FIG. 4C is a vertical section through the data cartridge narrow channel portion 210 and the chassis narrow guide portion 306.

Figure 5A:
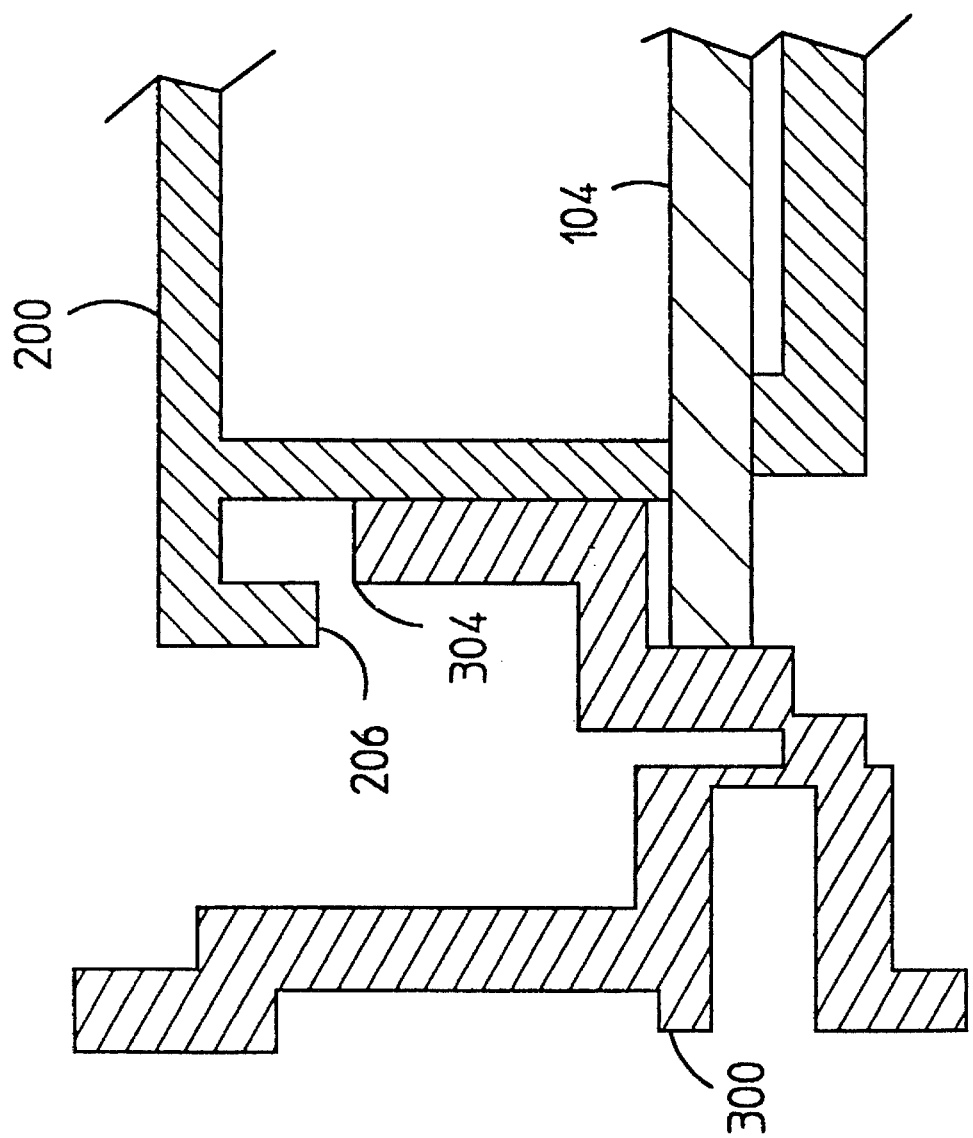
FIG. 5A is an expanded view of a portion of the cross section of FIG. 4B.
Figure 5B:
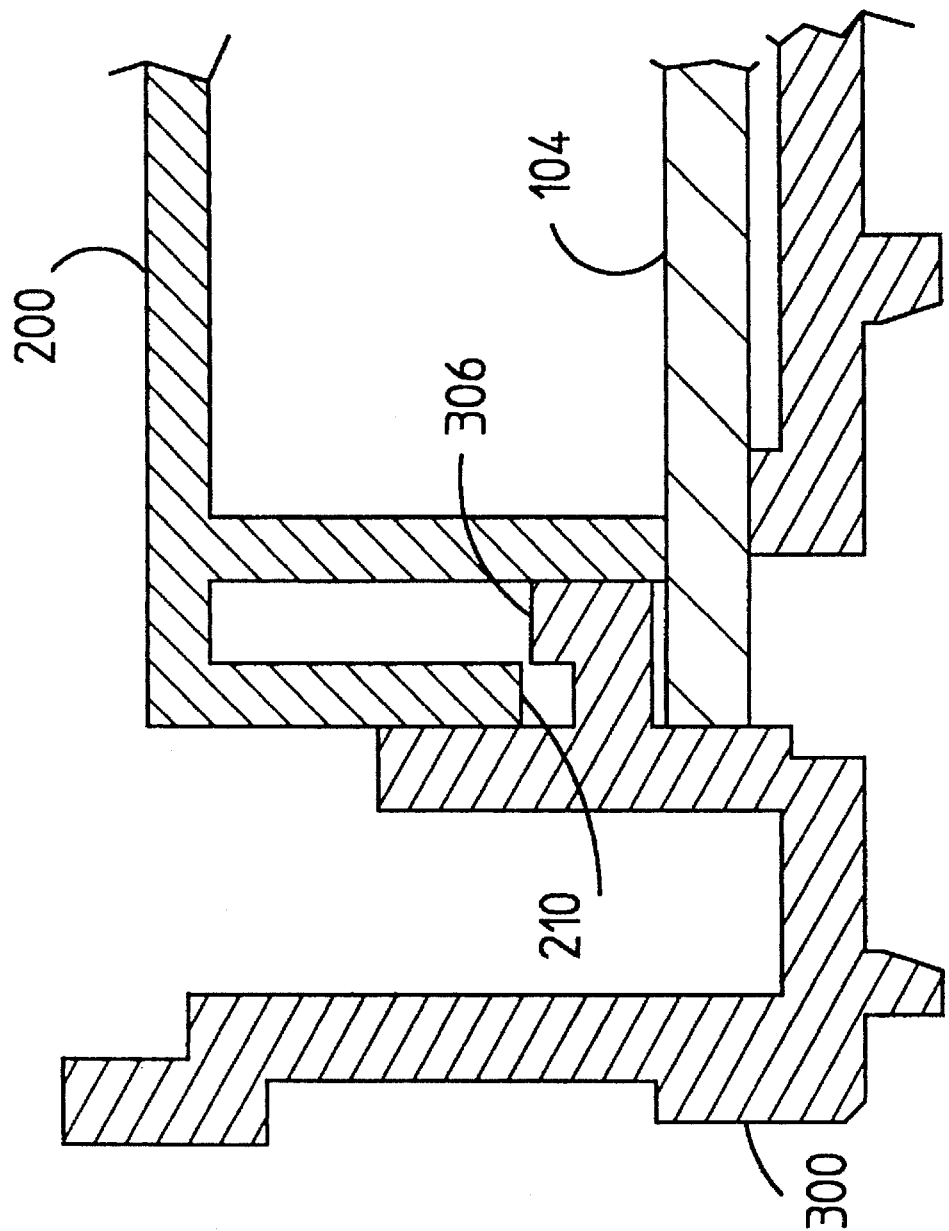
FIG. 5B is an expanded view of a portion of the cross section of FIG. 4C.

FIG. 5A is an expanded view of the guide/channel portion of FIG. 4B. FIG. 5B is an expanded view of the guide/channel portion of FIG. 4C. Recall from the background section that vertical alignment of the cartridge to the chassis is accomplished by spring-loaded rollers (not illustrated) that force the metal baseplate 104 up against the lower surface of the guide 302. Note in FIGS. 5A and 5B that the metal baseplate 104 for the cartridge is fully restrained vertically by the guide 302 just as in the original configuration illustrated in FIG. 1. This is important because partial support might have a negative effect on the precision of cartridge alignment and might also affect the guidance of the cartridge 200 as it is inserted into the chassis 300.

Figure 6:
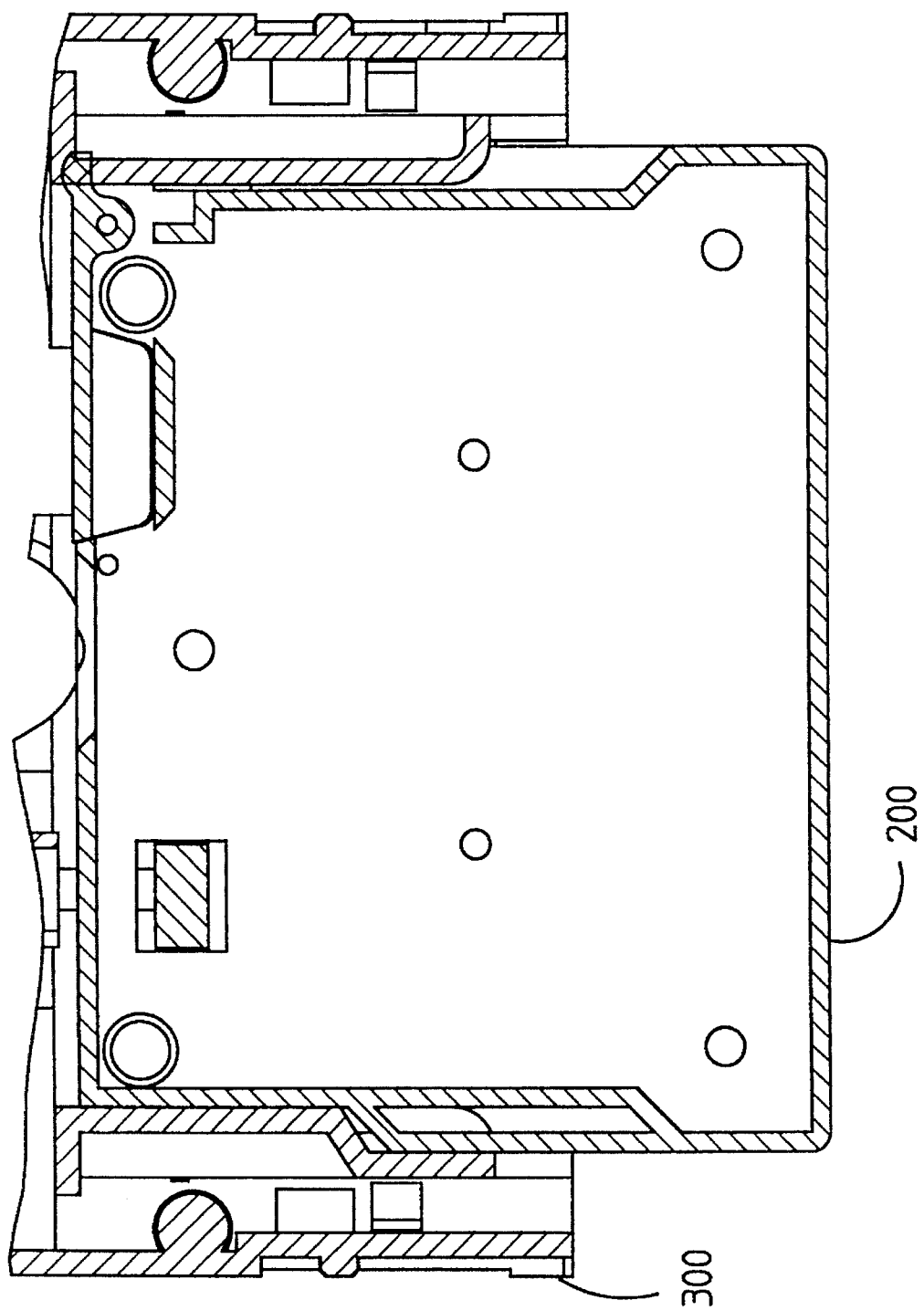
FIG. 6 is a horizontal cross-section through a data cartridge and drive chassis with the data cartridge fully inserted into the drive chassis.

FIG. 6 is a horizontal section through the new data cartridge and new drive chassis as illustrated in FIG. 3.

In summary, as illustrated in the figures, the new cartridge 200 cannot be inserted into a chassis 102 designed only for a prior art cartridge 100. A new chassis 112 can accept either a prior art cartridge 100 or a new cartridge 200. Note that although only mini-cartridges have been illustrated, having a narrow portion in a cartridge channel and a matching chassis guide would work just as well in the larger format cartridges and drives and for any other cartridge application using channels for guidance.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A guidance channel, in a magnetic tape cartridge, for aligning the magnetic tape cartridge in a compatible tape drive, the magnetic tape cartridge having a cartridge front surface and a cartridge side adjacent to the front surface, the guidance channel located in the cartridge side, the guidance channel comprising:

a first end penetrating the cartridge front surface;

a second end, the guidance channel continuing along the cartridge side from the first end to the second end;

a first channel portion at the first end, the first channel portion having a uniform first width; and a second channel portion having a uniform second width, the first width being substantially wider than the second width.

2. The guidance channel of claim 1, the magnetic tape cartridge having a baseplate attached to the cartridge front surface and the cartridge side, the baseplate having an exposed portion along the cartridge side, the guidance channel further comprising:

an edge formed by the exposed portion of the baseplate.

3. A guide in a chassis for a magnetic tape drive, the chassis having a chassis front and a chassis back, the chassis adapted to accept a tape cartridge through the chassis front, the guide comprising:

a guide front end toward the chassis front and a guide back end toward the chassis back;

the guide having a first width at the guide front end and a second width at the guide back end; and the first width being substantially unequal to the second width.

4. The guide of claim 3, the chassis having a chassis bottom surface, the guide further comprising:

a guide bottom surface that is substantially linear from the guide front end to the guide back end and substantially parallel to the chassis bottom surface.

5. The guide of claim 3, the first width being substantially narrower than the second width.

6. The guide of claim 5 further comprising:
   a first guide portion having a guide width uniformly equal to the first width; and
   a second guide portion having a channel width uniformly equal to the second width.

7. The guide of claim 6, the chassis having a bottom surface, the guide further comprising:
   a guide bottom surface that is substantially linear from the guide front end to the guide back end and substantially parallel to the chassis bottom surface.

* * * * *